Figure 1:
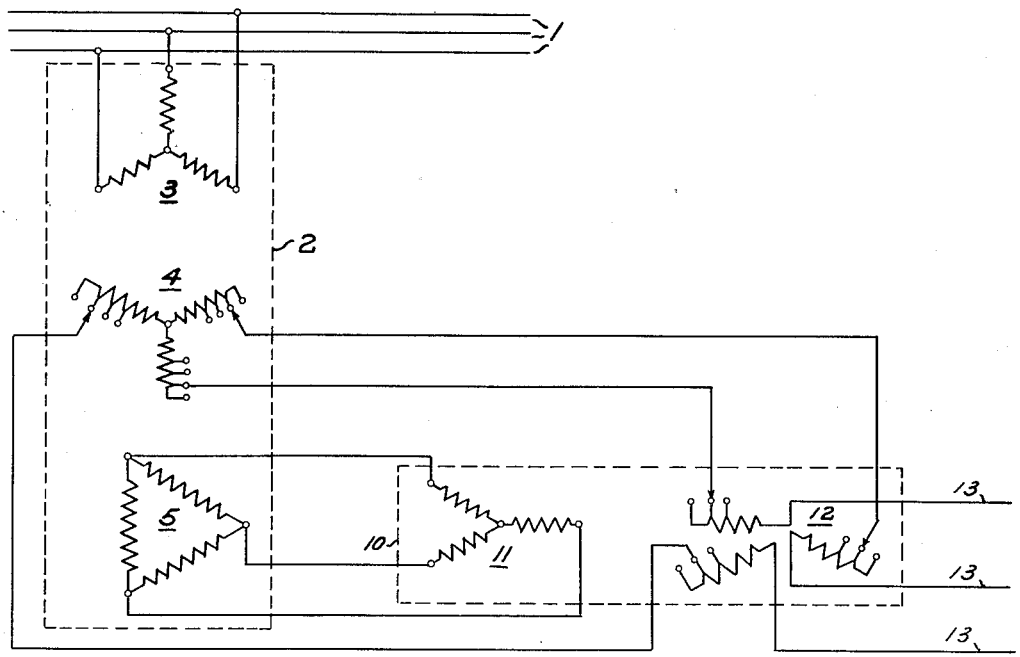

Sept. 12, 1933.   R. SCHÄRLI   1,926,689
TRANSFORMER SYSTEM
Filed May 19, 1932

Patented Sept. 12, 1933

1,926,689

UNITED STATES PATENT OFFICE 1,926,689

TRANSFORMER SYSTEM

Rudolf Schärli, Baden, Switzerland, assignor to Aktiengesellschaft Brown Boveri & Cie., Baden, Switzerland, a joint-stock company of Switzerland Application May 19, 1932, Serial No. 612,281, and in Germany May 18, 1931

7 Claims. (Cl. 172—238)

This invention relates to improvements in transforming systems for regulating the voltage of alternating current lines and more particularly to systems by which both the ratio and the angle of the voltage vector of the several phases of a polyphase alternating current line may be adjusted.

Alternating current potential regulating systems are known in which the voltage vectors are vectorially added to obtain any desired relation by changing the connections of the alternating current line with the windings of the transformers. Transformers have been constructed in which both the magnitude and the angle of the potentials are regulated in a single structure or a single system by the use of two regulating transformers in which the primary winding of the one transformer was connected in star and the primary winding of the other transformer was connected in delta, both windings being energized from the alternating current supply line. Such constructions are, however, subject to the disadvantage that the regulating transformer portions or transformers are always at high voltage because regulation is generally required for high tension transmission lines even though only a small portion of the total voltage is concerned in the regulation. Transformers for high voltages are, however, relatively large and expensive and the use of two regulating transformers magnifies such size and cost because both regulating transformers must be used to secure the desired regulation of the potential impressed on the distribution line. Even if the main transformer is tapped to obtain regulation of one of the quantities directly therefrom the regulating transformers required must be insulated for high voltage because of the connection of the primary windings thereof to the high voltage line.

It is, therefore, among the objects of the present invention to provide an improved regulating system for alternating current by which the magnitude and the angle of the voltage vectors may be varied.

Another object of the present invention is to provide an improved regulating system for alternating current employing a plurality of transformers, the voltage vector of a second transformer being produced at 90° relative to the voltage vector of a first transformer and the vectorial sum being such as to secure a change in both the magnitude and the phase angles of the voltage vector of the distribution line relative to the voltage vectors of the supply line.

Another object of the present invention is to provide an improved regulating system for alternating current employing a main transformer and an auxiliary transformer in which the magnitude of the voltage vector is controlled in the main transformer and the auxiliary transformer cooperates with the main transformer to secure variation of the vectorial angle of the distribution line voltage relative to the supply line voltage.

A further object of the present invention is to provide an improved regulating system for alternating current employing a main transformer and an auxiliary transformer in which the star connected primary winding of the auxiliary transformer is energized from a delta connected winding of the main transformer to permit excitation of the auxiliary transformer at low voltages.

Figure 2:
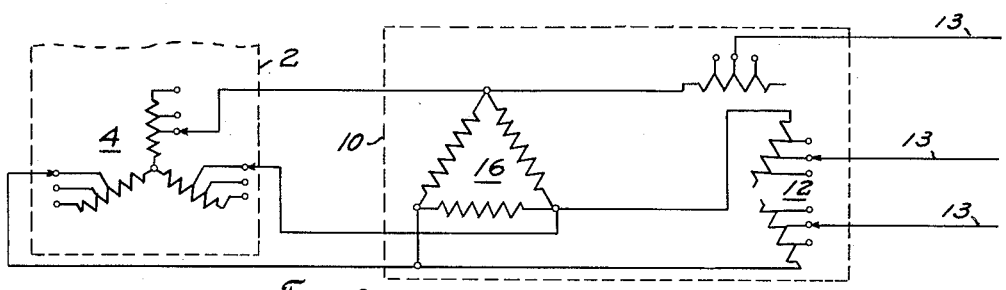
Figure 3:
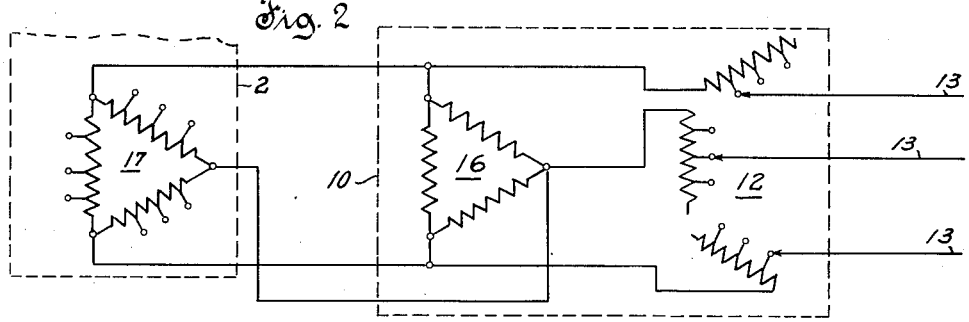

Objects and advantages other than those above set forth will be apaprent from the following description when read in connection with the accompanying drawing in which;

Figure 1 schematically shows one embodiment of the invention in which a main transformer has a primary, a secondary and a tertiary winding; the tertiary winding being connected with the primary winding of an auxiliary transformer which cooperates with the main transformer to secure regulation of the magnitude and angle of the voltage vectors in an alternating current distribution line;

Fig. 2 diagrammatically illustrates a modification of the invention in which the voltage supplied to the delta connected primary winding of an auxiliary transformer is taken from the tapped secondary winding of a main transformer; and Fig. 3 diagrammatically illustrates a modification of the invention in which the secondary winding of a main transformer is delta connected and supplies potential to the delta connected primary winding of an auxiliary transformer.

Referring more particularly to the drawing by characters of reference, the reference numeral 1 designates an alternating current transmission line connected with a suitable source of alternating current supply (not shown). The alternating current line 1 is connected with a transformer generaly designated at 2 and comprising a star connected primary winding 3, a star connected secondary winding 4 and a delta connected tertiary winding 5. The secondary winding 4 is tapped to permit adjustment of the number of active ampere turns of the winding in use.

An auxiliary transformer generally designated at 10 comprises a star connected primary winding 11 and an open star connected secondary winding 12 which is tapped. The tapped main transformed secondary winding 4 is conductively connected with the tapped auxiliary transformer winding 12 and the main transformer tertiary winding 5 is conductively connected with the auxiliary transformer primary winding 11. A feeder or distribution line 13 is connected with the secondary winding 12 of the auxiliary transformer 10. The several windings of the transformer are so arranged that adjustment of the taps of the secondary winding 12 of transformer 10 produces a voltage in the distribution line 13, the vector of which is displaced 90° relative to that of the secondary winding 4 of the transformer 2. Cooperative regulation of both secondary windings 4 and 12 thus produces regulation of the magnitude and the angle of the voltage vectors of the distribution line 13. The primary winding 11 of the auxiliary transformer is thus supplied with the lower voltage of the tertiary winding 5 rather than with the higher voltage of the supply line 1.

In the connections shown in Fig. 2, the primary winding 16 of the auxiliary transformer is delta connected and is conductively connected with the tapped star connected secondary winding 4 of the main transformer 2.

Fig. 3 illustrates a connection in which the secondary winding of the main transformer 2 is delta connected as at 17 and is conductively connected with the delta connected primary winding 16 of the auxiliary transformer 10.

In each of the modifications above described, the windings are so arranged that the vector of the voltage in the distribution line 13 is displaced 90° electrically relative to the vector of the voltage of the secondary winding of the main transformer 2.

Voltage regulation is thus attained by cooperation of the tapped secondary winding of transformer 2 and the tapped open star connected secondary winding 12 of the auxiliary transformer 10, changing of the taps of the former securing change in magnitude and changing of the taps of the latter securing change in the angle of the voltage vector of line 13 relative to the vector of line 1.

With a regulating system such as above described, only one regulating transformer is required and such transformer need not be insulated for the high voltage of line 1, but only for the lower voltage of the tertiary winding 5. The construction of such transformer is thus simplified and the cost and size of the transformer are reduced. Large power transformers are usually already provided with a delta connected tertiary winding such as winding 5 for the suppression of the higher harmonics. Such winding may then be used as shown to supply the excitation potential for the primary winding 11 of the auxiliary transformer 10 thus further simplifying and reducing the cost of the main transformer 2. It will be understood that transformers 2 and 10 may be built as one structure, it being necessary only to provide sufficient core structure to accommodate all of the winding and to avoid flux interference.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a system for regulating the voltage of alternating current distribution lines, an alternating current supply line, an alternating current distribution line, a transformer for regulating the ratio of the voltages in said lines, and a transformer for regulating the phase angles of the voltages impressed on said distribution line, one of said transformers being connected with the other of said transformers for magnetizing the same, the first said transformer being the source of exciting voltage for the second said transformer.

2. In a system for regulating the voltage of alternating current distribution lines, an alternating current supply line, an alternating current distribution line, a transformer for regulating the ratio of the voltages in said lines, and a transformer for regulating the phase angles of the voltages impressed on said distribution line, the first said transformer being the source of exciting voltage for the second said transformer.

3. In a system for regulating the voltage of alternating current distribution lines, an alternating current supply line, an alternating current distribution line, a transformer for regulating the ratio of the voltages in said lines by changing the vectorial sum of the voltages transmitted to said distribution line, and a transformer for regulating the phase angles of the voltages impressed on said distribution line by changing the vector direction of the voltages transmitted to said distribution line, the first said transformer being the source of exciting voltage for the second said transformer.

4. In a system for regulating the voltage of alternating current lines, an alternating current supply line, an alternating current distribution line, a transformer having a primary winding connected with said supply line, a variable secondary winding and a tertiary winding, and a transformer having a primary winding connected with the tertiary winding of the first said transformer and a variable secondary winding connected with the secondary winding of the first said transformer, said transformers controlling the magnitude and direction of the voltage vectors in said distribution line.

5. In a system for regulating the voltage of alternating current lines, an alternating current supply line, an alternating current distribution line, a transformer having a star connected primary winding connected with said supply line, a star connected secondary winding and a delta connected tertiary winding, and a transformer having a star connected primary winding connected with the tertiary winding of the first said transformer and an open star connected secondary winding connected with the secondary winding of the first said transformer, the secondary windings of both said transformers being variable to cooperate in controlling the magnitude and direction of the voltage vectors in said distribution line.

6. In a regulating system the combination of a polyphase alternating current high voltage transmission line, a relatively low voltage polyphase alternating current distribution line, a main transformer having a high voltage winding connected with said transmission line and having a low voltage winding connected with said distribution line, an auxiliary transformer having a primary winding energized from the low voltage winding of said main transformer and having a secondary winding serially connected with said distribution line so as to vectorially add voltages to said distribution line dephased relative to the voltage impressed on said distribution line by said low voltage winding, means associated with said main transformer for varying the ratio of transformation of said main transformer, and means associated with said auxiliary transformer for varying the magnitude of said dephased voltages so as to thereby vary the phase angle of the voltages impressed on said distribution line.

7. In a regulating system, the combination of two polyphase alternating current transmission lines, a main transformer interposed between said lines for transferring energy from one of said lines to the other of said lines at a lower voltage solely by induction, means for varying the ratio of transformation of said main transformer, an auxiliary transformer having a primary winding connected with said main transformer so as to be energized by said lower voltage and also having secondary winding serially connected with the conductors of one of said transmission lines so as to thereby supply voltages to said one of said transmission lines vectorially displaced with respect to the voltages of the other of said transmission lines, and means associated with said auxiliary transformer for varying the number of effective turns of the secondary windings of said auxiliary transformer so as to thereby vary the phase angle of the voltages impressed on one of said transmission lines relative to the voltages of the other of said transmission lines.

RUDOLF SCHÄRLI.